Aug. 8, 1939.                W. LINDENBERG                 2,168,998
                     FILM WINDING MECHANISM FOR CAMERAS
                            Filed Feb. 16, 1938
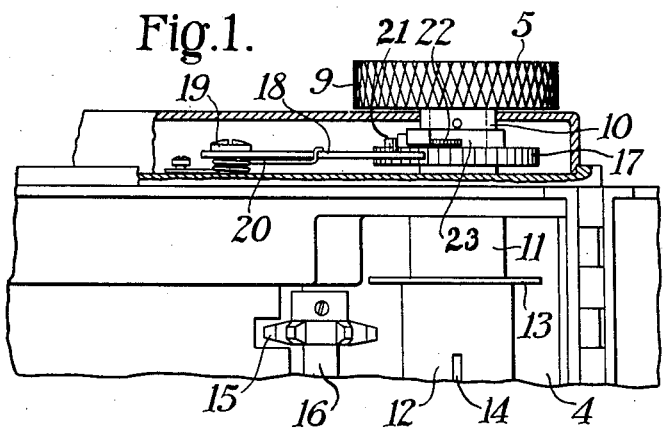
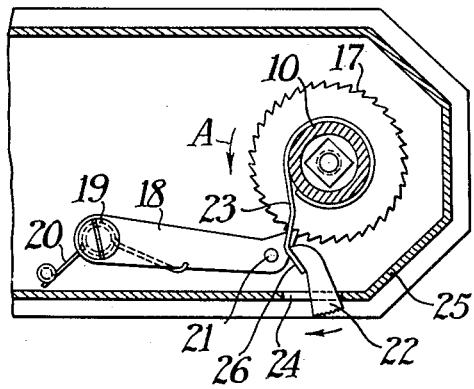   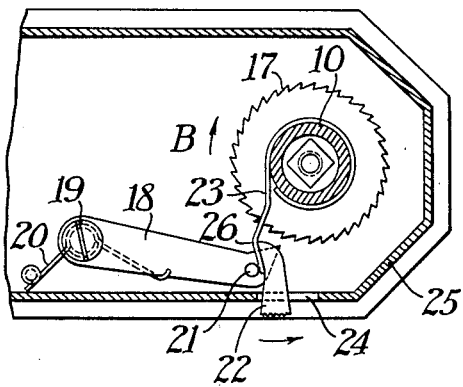
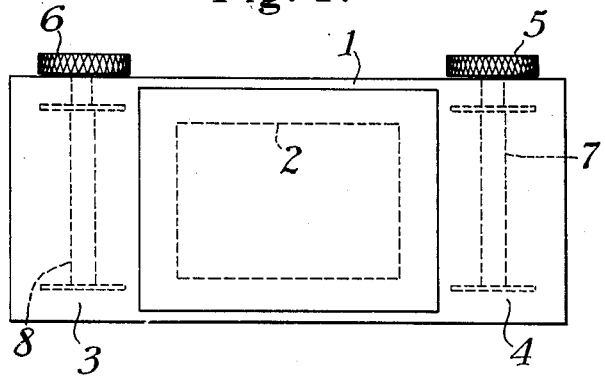
Wilhelm Lindenberg
    INVENTOR
BY
    ATTORNEYS Patented Aug. 8, 1939

2,168,998

UNITED STATES PATENT OFFICE 2,168,998

FILM WINDING MECHANISM FOR CAMERAS

Wilhelm Lindenberg, Stuttgart, Germany, assignor to Eastman Kodak Company, Rochester, N. Y., a corporation of New Jersey Application February 16, 1938, Serial No. 190,776
In Germany October 22, 1937

6 Claims. (Cl. 242—71)

This invention relates to photography and more particularly to photographic cameras in which spaced film spools are used, one for winding exposed areas of film and the other for winding the exposed films back onto the original spool.

One object of my invention is to provide such a camera in which the take-up film spool has a one-way clutch and to provide a manual means for releasing this clutch to permit rewinding the film. Another object of my invention is to provide a clutch disengaging means with a clutch engaging means which is automatically actuated by turning the take-up winding key in a direction to wind successive areas of exposed film. Still another object of my invention is to provide a camera in which the film may be wound in either direction and to provide a simple type of clutch mechanism which is automatically engaged when film is threaded to the take-up spool to be wound through the camera, and other objects will appear from the following specification, the novel features being particularly pointed out in the claims at the end thereof.

Coming now to the drawing wherein like reference characters denote like parts throughout:

Fig. 1 is a fragmentary elevation of parts of the take-up film spool and clutch.

Fig. 2 is a sectional view, parts being shown in elevation, of the take-up clutch and release.

Fig. 3 is a view similar to Fig. 2, but with the parts shown in a different position.

Fig. 4 is a diagrammatic view showing a typical camera equipped with the film winding and the film rewinding keys.

In many of the miniature cameras utilizing small size films, either perforated or unperforated, the cameras are provided with the two spool chambers for the supply and take-up reels of film. In loading such a camera the film is attached to the take-up reel, and this reel is turned intermittently to wind successive areas of film across an exposure area so that the various exposures can be made. After the film has been entirely used, it is customary to return the film to the supply reel side so that it can be rewound on the original spool.

In Fig. 4 I have diagrammatically shown a camera 1 having the usual exposure area 2 and having a supply spool chamber 3 at one end and a take-up spool chamber 4 at the opposite end. The take-up spool chamber 4 is provided with a winding key or winding mechanism designated broadly as 5 and the supply spool chamber 3 is provided with a second rewinding key 6. Each of these keys is adapted to engage film spools— the winding key 5 engaging a take-up spool 7 and the rewinding key engaging the supply reel 8. As thus far described, the construction is well known.

Referring particularly to Fig. 1, it will be seen that the winding key 5 consists of a knurled knob 9 which is attached to a shaft 10, this shaft extending downwardly and including a shoulder 11 to which a spool 12, having flanges 13, may be either permanently or detachably connected. This spool has a slot 14 into which the end of the film backing paper or the film itself may be attached. By turning the winding key 5 in the direction shown by the arrow A of Fig. 2, film is wound on the spool 12.

In the present embodiment, the film passes over a toothed sprocket 15 rotatably supported on a shaft 16, although this is not a necessary part of the present invention.

The winding key, which, as above explained, includes the shaft 10, carries affixed thereto a ratchet wheel 17 which is normally engaged by a pawl 18 pivoted at 19 to the camera and pressed by a spring 20 into engagement with the ratchet wheel. This pawl carries an upstanding pin 21. In normal operation of the camera, when film is being wound past the exposure aperture 2 by the winding key 5, the pawl always engages the ratchet and prevents reverse turning of the film spool 12. After all of the exposures have been made and it is desired to wind the film in a reverse direction upon a supply reel 8, it is necessary to release this clutch.

Accordingly, I provide a manually movable member 22 which is attached to a lever arm 23, fulcrumed on the shaft 10. This lever arm is preferably in the form of a spring wire which at least partially encircles the shaft 10 and which is so formed that it resiliently engages this shaft. There is, therefore, a tendency for the lever 23 to turn when the shaft 10 is turned, although the friction is such that a slip connection is formed.

The manually operable member 22 extends out through a slot 24 in the housing 25 which encloses this mechanism and the two edges of this slot form stops limiting the movement of this member.

When it is desired to rewind film, permitting the shaft 10 to turn in the direction of the arrow B in Fig. 3, an operator moves the handle 22 in the direction shown by the arrow in Fig. 2. This causes an inclined portion 26 of the arm to engage the upstanding pin 21 and cam it away from the ratchet wheel as indicated in Fig. 3. The shaft 10 is therefore free to rotate in a reverse direction, and by turning the winding key 6, the film can be returned to the supply reel 8 in the spool chamber 3. The film is then removed and a fresh film loaded in the supply spool chamber 3, the end being preferably attached to the slot 14 in the reel 12. The first turn of the winding key 5 in the direction shown by the arrow in Fig. 2 causes the lever 23 to rotate with the shaft 10 until the lever 23 strikes the edge of the slot as shown in Fig. 2. In this position it is moved away from the upstanding pin 21 on the pawl 18 and the pawl, under the impulse of its spring 20, again engages the ratchet 17.

Thus, it is not necessary for an operator to remember to release the manually operable latch 22 and manually move it in the direction shown by the arrow in Fig. 3, although, of course, this can be done manually. However, it need not be manually actuated, since the first rotation of the key 5 automatically re-engages the pawl and ratchet. This simplifies the operation of threading and prevents the operator from forgetting to restore the pawl and ratchet to an operative position.

What I claim as my invention and desire to be secured by Letters Patent of the United States is:

1. In a camera of the type utilizing roll film, the combination with a camera body, of supply and take-up spool chambers therein, a winding and a rewinding key carried one in each spool chamber, one for winding successive areas of film for exposure and the other for rewinding the exposed film, a one-way clutch for one winding key normally preventing movement of the winding key in one direction, a manually operable member for releasing the clutch for rewinding film, connections between said manually operable member and winding key for automatically engaging the one-way clutch and releasing said manually operable member actuated by turning said winding key in a direction to wind film.

2. In a camera of the type utilizing roll film, the combination with a camera body, of supply and take-up spool chambers therein, a winding and a rewinding key carried one in each spool chamber, one for winding successive areas of film for exposure and the other for rewinding the exposed film, a one-way clutch for one winding key normally preventing movement of the winding key in one direction comprising a pawl and ratchet, a pivotal mount for said pawl, a spring tending to engage the pawl and ratchet, a manually operable lever for releasing the pawl and a slip connection between the release lever and winding key for moving the former by the latter whereby the pawl may engage the ratchet by turning said key in a normal direction to wind film.

3. In a camera of the type utilizing roll film, the combination with a camera body, of supply and take-up spool chambers therein, a winding and a rewinding key carried one in each spool chamber, one for winding successive areas of film for exposure and the other for rewinding the exposed film, a one-way clutch for one winding key normally preventing movement of the winding key in one direction comprising a pawl and ratchet, a pivotal mount for said pawl, a spring tending to engage the pawl and ratchet, a manually operable lever for releasing the pawl and a slip connection between the release lever and winding key comprising a resilient member at least partially encircling the winding key for moving the manually operable member away from the pawl when said key is turned to wind film whereby the spring may engage the pawl and ratchet and prevent reverse turning of the winding key.

4. In a camera of the type utilizing roll film, the combination with a camera body, of supply and take-up spool chambers therein, a winding and a rewinding key carried one in each spool chamber, one for winding successive areas of film for exposure and the other for rewinding the exposed film, a one-way clutch for one winding key normally preventing movement of the winding key in one direction comprising a pawl and ratchet, a pivotal mount for said pawl, a spring tending to engage the pawl and ratchet, a manually operable lever for releasing the pawl, a lever support for the manually operable member consisting of a resilient wire supporting said member and constituting a lever, the wire extending to and having frictional contact with the winding key, whereby movement of the key may turn the pawl release from engagement with the pawl and the pawl spring may engage the pawl and ratchet.

5. In a camera of the type utilizing roll film, the combination with a camera body, of supply and take-up spool chambers therein, a winding and a rewinding key carried one in each spool chamber, one for winding successive areas of film for exposure and the other for rewinding the exposed film, a one-way clutch for one winding key normally preventing movement of the winding key in one direction comprising a pawl and ratchet, a pivotal mount for said pawl, a spring tending to engage the pawl and ratchet, a manually operable lever for releasing the pawl, a lever support for the manually operable member comprising a wire, an angularly arranged cam surface on the wire adapted to cam said pawl out of engagement with said ratchet, one end of said wire being looped about the winding key to frictionally engage and be turnable relative thereto, whereby said wire may turn with the winding key moving the cam away from the pawl, whereby the pawl and ratchet engage when said key is turned to wind film.

6. In a camera of the type utilizing roll film, the combination with a camera body, of supply and take-up spool chambers therein, a winding and a rewinding key carried one in each spool chamber, one for winding successive areas of film for exposure and the other for rewinding the exposed film, a one-way clutch for one winding key normally preventing movement of the winding key in one direction comprising a pawl and ratchet, a pivotal mount for said pawl, a spring tending to engage the pawl and ratchet, a manually operable lever for releasing the pawl, a lever support for the manually operable member consisting of a resilient wire supporting said member and constituting a lever, the wire extending to and having frictional contact with the winding key, stops limiting movement of the manually operable lever, the film winding movement of said key tending to hold said lever against one stop in which it is out of engagement with said pawl, said manually operable member being manually operable toward the other stop to cam said pawl from said ratchet to permit rewinding film.

WILHELM LINDENBERG.